June 18, 1968 TADASHI KUME 3,388,616
COMPOSITE CRANKSHAFT
Filed Oct. 26, 1965
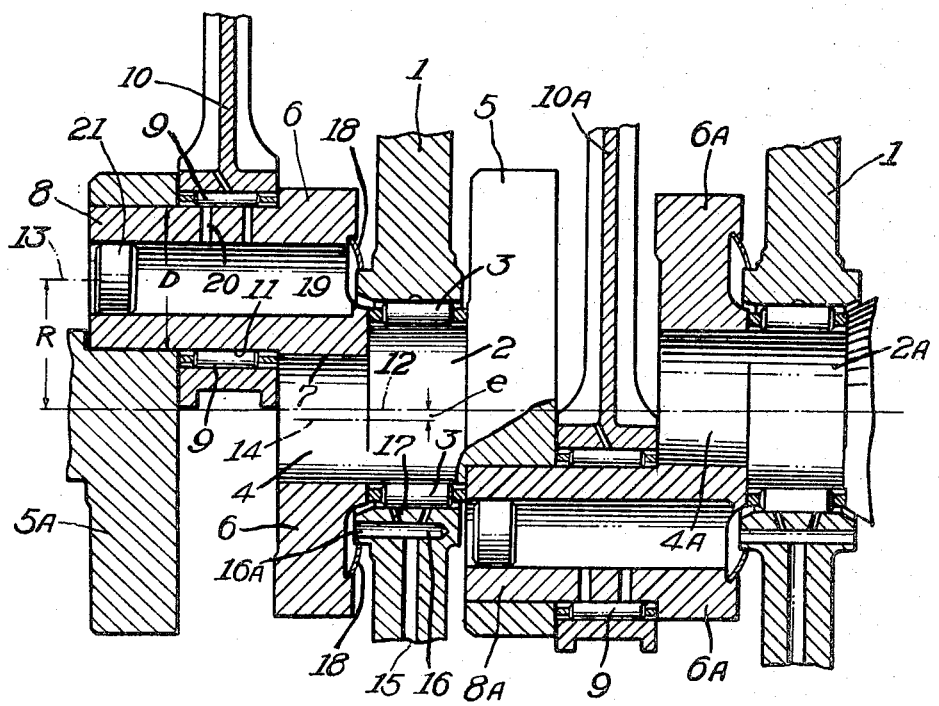
INVENTOR
Tadashi Kume
BY Oldham & Oldham 3,388,616
COMPOSITE CRANKSHAFT
Tadashi Kume, Tokyo, Japan, assignor to Kabushiki Kaisha Honda Gijutsu Kenkyusho, Yamato-machi, Kilaadachi-gun Saitama-ken, Japan
Filed Oct. 26, 1965, Ser. No. 505,268
7 Claims. (Cl. 74—597)

ABSTRACT OF THE DISCLOSURE

A composite crankshaft which includes shaft and crank pieces fitted together through the medium of an integral axial pin portion of the shaft piece, the axial pin portion being decentered with an axis radially offset from that of the crankshaft in a direction opposite to the crankpin portion of the crank piece and thus is made in an increased diameter to enhance the solidity and strength of the fitting connection between the shaft and crank pieces without reducing the effective diameter of the crankpin portion of the latter.

---

The present invention relates to composite crankshafts which are preferred for their convenience in machining and assemblage.

The type of crankshaft with which the present invention is concerned includes a main shaft portion to be journaled in a machine frame and an integral axially extending pin formed on one end face of said main shaft portion so as to be forcibly fitted in the adjacent crank arm.

The present invention has for its object to enhance the solidity and strength of the fitting connection between the axially extending pin and the adjacent crank arm portion of the crankshaft of the type described so that it may be used in high power applications with sufficient reliability and effectiveness.

According to the present invention, there is provided a composite crankshaft of the type described in which the axially extending pin formed on one end face of the main shaft portion is radially offset from the axis thereof in a direction away from the crankpin portion integral with the adjacent crank arm in which said axially extending pin is forcibly fitted.

This arrangement is advantageous in that the axially extending pin can be made in an increased diameter to enhance the solidity and strength of the fitting connection between the pin and the adjacent crank arm without any danger of detracting the strength of the crankpin.

The foregoing and other objects, features and advantages of the present invention will become apparent from the following description when taken in conjunction with the accompanying drawing, which illustrates one embodiment of the present invention as applied to an internal combustion engine.

In the drawing, reference numeral 1 indicates portions of the engine frame in which the main shaft portions 2 and 2A of the composite crankshaft are journaled through the medium of roller bearings 3. Fitting pins 4 and 4A are formed on one end face of the main shaft portions 2 and 2A, respectively. On the other end face of the main shaft portion 2 is formed an integral crank arm means 5. Another crank arm 6 has formed in it an aperture 7, in which the adjacent axially extending pin 4 is forcibly fitted to form a solid connection between the two components 6 and 2. The crank arm 6 apparently extends radially and is connected integrally with a crankpin 8 at its one end. A piston rod 10 is mounted on the crankpin 8 by way of a roller bearing 9 which is fitted over the peripheral surface 11 of the crankpin 8. Fitted on the other end of the crankpin 8 is another crank means 5A. Similarly, the crank arm means 5 previously mentioned has a crankpin 8A firmly fitted therein, the latter extending axially from a further crank arm 6A, which is firmly connected with the axially extending pin 4A on the adjacent main shaft portion 2A. Reference numerals 12 and 13 indicate the respective axes of the main shaft 2 and the crankpin 8, which are radially offset from each other by a distance R. The crankpin 8 itself has an outer diameter of D.

Reference numerals 15, 16 and 17 indicate passages for circulation of lubricant oil, the roller bearing 3 being lubricated with oil fed through the passages 17. An oil retainer ring 18 is fixed to the adjacent side of the crank arm 6 to cover an axial bore 19 of substantial diameter formed in the crankpin 8 while ensuring communication between the bore and the open end 16A of the passage 16. Oil passages 20 are formed in the crankpin 8, as shown, and are in communication with the bore 19, which is closed at the other end by a plug 21. This arrangement serves to lubricate the roller bearing 9 effectively with oil from the passage 16.

For high power applications of the composite crankshaft of the form described above, not only the crankpins 8 and 8A should have a sufficiently large diameter but also the axially extending pins 4 and 4A formed integral with the main shaft portions 2 and 2A, respectively, should have a diameter large enough to obtain a required solid fitting connection between the axially extending pins 4, 4A and the crank arms 6, 6A. With conventional composite crankshafts of the general form, including axially extending pins 4, 4A formed on the respective main shaft portions 2, 2A in axial alignment with the latter, a deficiency has been involved that the diameter of the axially extending pins cannot be safely increased to any desired extent. If the pin were made to have a radius, for example, larger than $(R-D/2)$, the corresponding aperture 7 formed in the crank arm 6 to receive such pin would extend into the crankpin portion 8 radially inwardly beyond the bearing surface 11 thereof to substantially reduce the strength of the adjoining crankpin portion. In addition, such aperture would itself be more difficult to machine.

According to the present invention, the axially extending pin portion 4 has its axis offset from that of the main shaft portion 2 by an appropriate distance $e$ in a direction away from the crankpin portion 8 and this apparently enables the axially extending pin portion 4 to have a radius larger than $(R-D/2)$ without involving the deficiency pointed out herein before and thus to attain an increased solidity and strength in the fitting connection between such pin 4 and the adjacent crank arm 6.

It should be understood that the choice for description of the invention of one embodiment as applied to an internal combustion engine restricts in no way the scope of the invention but it can also be applied with success to other various multiple-throw machines.

What is claimed is:
1. A composite crankshaft including
   a machine frame,
   a main shaft portion journalled in said frame,
   an axially-extending pin portion formed on one end face of said main shaft portion,
   an adjacent crank arm having a crank pin, said axially-extending pin portion being forcibly fit in the crank arm, said axially-extending pin portion having an axis offset from that of said main shaft portion by an appropriate distance in a direction away from said crankpin.

2. The combination defined in claim 1 wherein the radius of the pin is greater than $R-D/2$, where R equals that distance between the axis of the main shaft and the axis of the crank pin and D equals the diameter of the crank pin.

3. A composite crankshaft according to claim 1 wherein each shaft includes,
   an integral, axially parallel, radially-offset pin extending from one of the ends of the shaft, and
   an integral crank arm means extending at substantially right angles from the other end of the shaft.

4. A composite crankshaft according to claim 3 wherein each crank pin means includes
   an integral female member which receives said radially-offset pin, and
   an integral male member which is received by said crank arm means of the adjacent shaft.

5. A composite crankshaft according to claim 4 wherein said piston rod means are journalled on the peripheral surface of each male member of said crank pin means.

6. A composite crankshaft according to claim 5 wherein the integral crank pin of said crank pin means has an axially extending bore, and an oil passage connecting the bore with said piston rod means.

7. A composite crankshaft according to claim 6 wherein said plurality of shafts are journalled to said frame by a plurality of bearing means, said bearing means adapted to be lubricated by the circulation of oil fed through oil passages in the frame, the oil passages also adapted to feed oil to the bore in said crank pin.

References Cited
UNITED STATES PATENTS 2,288,068   6/1942   Brebeck.

OTHER REFERENCES

German printed application 1,062,487, July 30, 1959.

FRED C. MATTERN, JR., *Primary Examiner.*

W. S. RATLIFF, *Assistant Examiner.*